United States Patent Office 3,453,533
Patented July 1, 1969

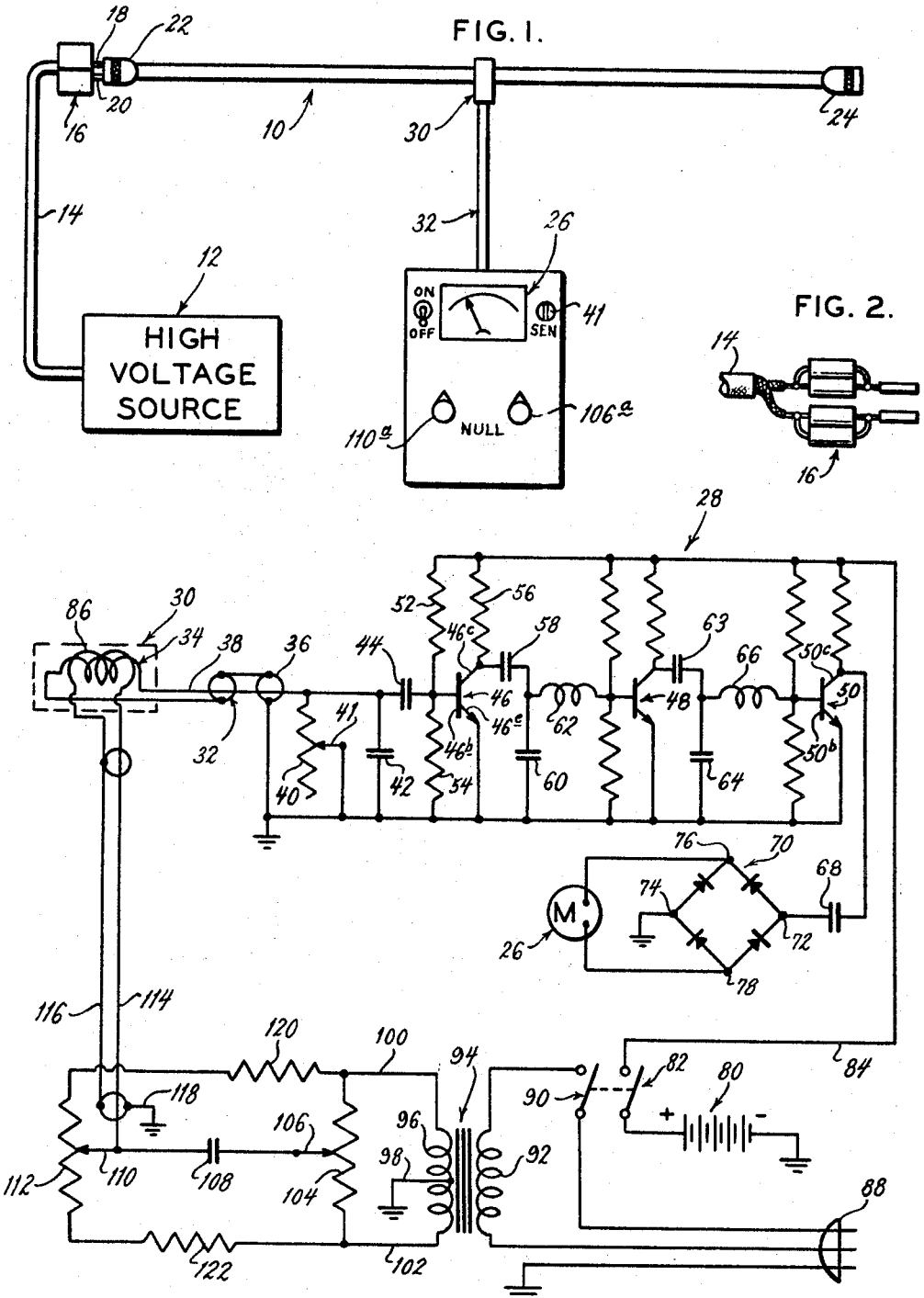

3,453,533
MEANS INCLUDING A TEST PROBE HAVING A PAIR OF INDUCTIVELY COUPLED WINDINGS FOR LOCATING FAULTS IN CONDUCTORS
John J. Cox, St. Charles, Mo., assignor, by mesne assignments, to McDonnell Douglas Corporation, St. Louis, Mo., a corporation of Maryland
Filed Feb. 3, 1964, Ser. No. 342,190
Int. Cl. G01r 19/00, 31/08
U.S. Cl. 324—52         13 Claims The subject invention relates generally to fault locating devices and the like and more particularly to a device for locating faults in wires such as the wires in electric cables and the like.

Many devices have been constructed and employed heretofore for locating faults such as shorted and open circuited conditions resulting from defective wires in cables and like devices, and some of the known and available devices have been satisfactory for locating certain types of defects. For the most part, however, the known and available fault locating devices have certain disadvantages and shortcomings which limit their usefulness and make them unsatisfactory for many purposes. For example, many of the known devices apply test signals or impulses to wires being tested and in many cases these test signals themselves further aggravate an already defective or weakened condition and may even produce a defect where none existed. The known devices are also relatively insensitive and are incapable of locating and identifying many defective conditions including defects which may permit normal operation under some conditions but not under other conditions. Furthermore, all known fault locators are relatively expensive, cumbersome, complicated, and difficult to operate. The known devices are also unsuitable for many purposes including field use and in areas of limited access and many of the known devices are relatively non-portable. The known devices, for the most part, also employ bridge circuits and the like which are balanced by connecting a wire to be tested into one or more of the legs thereof. Bridge circuits for this purpose are not always satisfactory, however, especially where the ends of a wire to be tested are far apart or not readily accessible for some reason. Furthermore, bridge circuits will not always indicate a defect which occurs only under certain operating conditions and not under others. The known devices also require relatively skilled operators.

The present fault locator device overcomes these and other disadvantages and shortcomings of the known devices and provides fault locator means which are relatively inexpensive to make, relatively easy to use, extremely sensitive, portable, and will not produce or aggravate an existing defective condition in a wire being tested.

The subject fault locator device comprises a relatively high voltage source for connection to the ends of the wires to be tested, a meter and meter control circuit, and a signal sensitive probe adapted to be positioned adjacent to a wire being tested at an intermediate location to sense and produce impulses in response to the application of test signals applied to the wire by the high voltage source. The subject device also includes means for limiting current flow in the wires under test in order to prevent producing a defect or aggravating an existing one particularly by carbonization of the wire under test. The subject fault locator also includes means to prevent undesired signals from effecting the test meter.

A main object of the present invention is to provide improved means for locating faults in wires and the like.

Another object is to provide a fault locator capable of locating shorted conditions and high resistance breakdowns.

Another important object is to devise fault locator means which will not damage an item under test.

Another object is to devise fault locator means capable of locating faults that occur under some but not all conditions, such as faults that occur under relatively high potential operation but not under relatively low potential conditions.

Another object is to provide fault locating means which are relatively inexpensive to construct and easy to use even by relatively unskilled personnel.

Another object is to reduce the currents produced by fault locating devices.

Another object is to provide a relatively compact, light weight fault locator which can be used in the field and in relatively inaccessible places.

Another object is to provide means for suppressing undesired signals in fault locator equipment.

Another object is to provide transistorized fault locator means.

These and other objects and advantages of the present fault locator will become apparent after considering the following detailed specification which covers a preferred embodiment thereof in conjunction with the accompanying drawing, wherein:

FIG. 1 is a block diagram of a fault locator constructed according to the present invention;

FIG. 2 is a fragmentary view showing a current limiting circuit for use with the subject fault locator; and FIG. 3 is a schematic diagram of an electronic circuit of the subject fault locator.

Referring now to the drawings more particularly by reference numbers, the number 10 refers to a cable having a plurality of individual wires or conductors therein which can be tested for faults such as for shorts by means of the subject fault locator. The subject fault locator includes a high voltage source 12 which is connected to selected conductors in the cable 10 to be tested. The high voltage source is connected to the selected cable conductor by means of a cable 14, a current limiting device 16 (FIG. 2), and a pair of connectors 18 and 20 which are attached to or otherwise put in contact with the desired cable conductors to be tested. For example, the cable 10 may have connectors 22 and 24 at the ends thereof into which suitable prongs are positioned. It is not necessary, however, to have such connectors 22 and 24 and the members 18 and 20 can instead be attached or clipped directly to individual wire ends.

The subject fault locator also includes a direct current microammeter 26 and an associated meter circuit 28. The ammeter circuit 28 is connected to a test probe 30 which includes inductively coupled windings capable of producing test signals in response to electrical signals applied to the wires under test by the high voltage source 12. The signals sensed by the pick-up probe 30 are fed to the input to the meter circuit 28 on cable 32.

The pick-up probe 30 is shown in FIG. 3 as including a first coil 34 which is connected to the inner and outer conductors of the coaxial cable 32 at one end thereof. The opposite end of the coaxial cable 32 is connected to the input of the circuit 28. The outer conductor 36 of the coaxial cable 32 is grounded, and an inner conductor 38 carries the input signal to the non-grounded side of an adjustable resistor 40 which controls the circuit sensitivity. The magnitude or sensitivity of the input signal can therefore be controlled by adjusting the resistor 40, one side of which is connected to the conductor 38 and the opposite side of which is connected to ground. Thereafter, the input signal is fed to the non-grounded side of a capacitor 42 which has its opposite side grounded. It can therefore be seen that the capacitor 42 is connected in parallel with the input coil 34, and the two elements 34 and 42 form a tank circuit which is tuned to a particular input frequency such as 60 cycles.

The input signal is then fed to and through another capacitor 44 to the input of a first stage of a high gain amplifier circuit which is shown for illustrative purposes as having three stages each of which includes a transistor 46, 48 and 50 respectively. The input signal is fed to the base element 46b of the transistor 46 between two biasing resistors 52 and 54. The emitter element 46e of the same transistor 46 is shown grounded, and the output of the first stage amplifier is fed on the collector element 46c to the common junction of a load resistor 56 and a coupling capacitor 58. The output signal passes through the capacitor 58 to the input circuit of the second stage transistor 48 which has an input circuit that includes a capacitor 60 and a coil 62 selected to receive and pass the desired signal. The second stage amplifier circuit is similar in construction to the first stage amplifier and therefore need not be described in detail.

The output from the second stage amplifier circuit is similarly fed to an input circuit of the third stage amplifier which also includes a coupling capacitor 63, a grounded capacitor 64 and an input coil 66. The input signal to the third stage amplifier is also fed to the base element 50b of the third stage transistor 50 and the output of the third stage is likewise taken from the collector element 50c and fed to an output circuit which includes a coupling capacitor 68 and a full wave rectifier circuit 70. The output signal appears across opposite terminals 72 and 74 of the full wave rectifier circuit 70 and the terminal 74 is grounded. The microammeter 26 is connected across the other opposite terminals 76 and 78 of the same full wave rectifier circuit 70.

The power for the amplifier circuit is provided by a battery 80 which has its negative terminal grounded and its positive side connected to one side of a switch 82. The opposite side of the switch 82 is connected by a lead 84 to the various circuits of the three stage amplifier circuit described above.

The circuit 28 is also provided with a second power supply for supplying an AC signal to a second coil 86 in the test probe 30. The AC signal can be a controlled 60 cycle signal obtained from a readily available 60 cycle outlet using a plug-in receptacle 88. The receptacle 88 has three terminals, one of which is grounded, and the other two of which are connected by suitable leads to opposite ends of a series circuit which includes a second switch 90 and a primary winding 92 of a transformer 94. The transformer 94 also has a secondary winding 96 which is grounded at its center by lead 98, and which has its opposite ends connected by lead 100 and 102, respectively, to opposite ends of an adjustable resistor 104. The resistor element 104 includes a movable contact 106 which is connected to a capacitor 108, and the opposite side of the capacitor 108 is connected to the movable contact 110 of another adjustable resistor 112. The movable contact 110 and the capacitor 108 are also connected to the center conductor 114 of another coaxial cable. The outer conductor 116 of the same cable is grounded by lead 118. The opposite end of the cable center conductor 114 is connected to one end of a second coil 86 positioned in the test probe 30, and the other end of the probe coil 86 is connected to the grounded outer coaxial cable conductor 116. The opposite ends of the adjustable resistors 104 and 112 are connected respectively to opposite ends of other resistors 120 and 122 as shown in FIG. 3.

The circuit in which the second probe coil 86 is connected is in the nature of a bridge circuit which is used to produce a null condition in the meter 26. The null condition is obtained by adjusting the two adjustable contacts 106 and 110. The two control knobs shown on the front of the meter housing in FIG. 1 are the means for making the null adjustment.

The subject fault locator is operated by first connecting the high voltage source 12 to the conductors to be tested, locating the test probe 30 adjacent to the conductor or cable to be tested at an intermediate location, and then establishing a null condition in the meter 26 using the adjustable members 106a and 110a. The desired sensitivity can also be adjusted by adjusting the member 41 which controls the position of the movable member associated with the adjustable resistor 40. After the sensitivity and null conditions have been established, a high voltage signal is applied to the desired connected cable conductors and the meter is observed to see what, if any, reading is obtained. The characteristics of the applied high voltage signal are not particularly important. It is, however, desirable to connect a current limiting circuit 16 such as that shown in FIG. 2 between the output of the high voltage source 12 and the particular cable conductor or conductors being tested. This is done to limit current flow in the conductors under test to prevent carbonization of the conductors which is a condition which can itself produce a fault or further deteriorate and weaken an existing fault. It frequently occurs, as noted above, that a conductor will operate satisfactorily at low voltage conditions but not at high voltages. This usually occurs because of a shorted or partially shorted condition and such conditions are difficult if not impossible to detect with known equipment. This condition can, however, be detected by the subject fault locator without producing any further deterioration of the condition. This is an important advantage of the subject device and in part is due to the addition of current limiting means in conjunction with the high voltage test source.

The current limiting device 16 includes a bundle of parallel connected resistors in each of the circuits from the high voltage source to a conductor. The number and sizes of the resistors in each bundle can be varied so long as the resistance of the bundle is selected to substantially reduce the current that might otherwise flow to the wires. This is obtained by having the resistance of the bundle relatively large in comparison to the resistance of the conductors under test.

The subject circuit therefore has the advantage of being able to operate without damaging the item under test, and is also relatively small, lightweight, and compact, and requires very little power to operate. Furthermore, the subject device is portable and therefore can be used at field locations and in places of limited space and access. The subject device is also relatively simple to operate and calibrate, and is fully adjustable for testing cable conductors of different sizes and shapes. Furthermore, the subject fault locator can locate faults which occur only under certain operating conditions and not under others.

The subject fault locator is able to locate faults ranging from dead shorts to high voltage arcs and is also able to test individual wires in bundles or cables of wires under laboratory as well as field conditions as long as both ends of the wire are accessible for connection. The usual procedure for making tests is to mount the pick-up probe on the wire bundle or cable after establishing a null condition at a desired sensitivity level and applying the high voltage first to one end of the wire and then to the other. The current flow in the wire will then be detected by the pick-up probe and amplified, rectified and fed to the meter 26 as described above. Any ambient hum level that may be present will be cancelled out by the null controls incorporated in the pick-up probe. The sensitivity control aids the nulling operation and reduces the high level signals to values that can be read on the meter. The meter circuit is designed to be sensitive to 60 cycle signals only because arcing breakdown usually generate higher frequency signals which might otherwise radiate with such intensity as to cause standing waves which, if accepted into the circuit, will cause erroneous results. Interstage coupling including radio frequency chokes are also provided to by-pass the higher frequency signals to ground. While the subject device was designed primarily for the determination of faults located at or near the ends of wires, it can also be used to locate other faults simply by interpreting the meter readings.

Thus there has been shown and described a novel fault locator device which fulfills all of the objects and advantages sought therefor. Many changes, modifications, variations and other uses and applications for the subject fault locator will, however, become apparent to those skilled in the art after considering this specification and the accompanying drawings. All such changes, modifications, alterations and other uses and applications which do not depart from the spirit and scope of the invention are deemed to be covered by the invention which is limited only by the claims which follow.

What is claimed is:

1. Means for locating faults in conductors and the like comprising a first signal source for generating a characteristic signal adapted to be connected to a conductor under test, and means responsive to the application of a signal into the conductor under test by the first signal source for indicating the condition of the conductor under test, said signal responsive means including a test meter circuit and a probe adapted to be positioned adjacent to and movable relative to the conductor to be tested, said probe including first and second inductively coupled windings the first of which is responsive to the characteristic signal and connected to the meter circuit, a second signal source including means for connecting said second signal source to the second inductively coupled test probe winding, and means for adjusting said second signal source to minimize the effects in said first test probe winding of signals that may be present in the conductor due to the environment in which the conductor is situated.

2. The means for locating faults defined in claim 1 wherein said second signal source includes a source of alternating voltage, a bridge circuit connected between said second source and said second inductively coupled test probe winding, and means for adjusting said bridge circuit to produce a minimum indication on the signal responsive means.

3. Means for locating faults in a conductor comprising a test probe movable relative to the conductor including first and second inductively coupled windings, a first signal source and means connecting said source to said first winding, said second winding responding to a characteristic test signal produced in a conductor being tested, an amplifier circuit having an input connected to said second test probe winding, a meter connected to the output of said amplifier circuit, means including said first signal source for exciting said first test probe winding to produce a null condition in said second test probe winding to minimize the effects in said second test probe winding of signals that may be present in the conductor due to the environment in which the conductor is situated, and means for applying a relatively high voltage characteristic test signal to the conductor under test, said last named means including a source of relatively high voltage and means including impedance means connected between said source and the conductor being tested, the impedance of said impedance means being relatively high compared to the impedance of the conductor being tested to limit current flow in the conductor.

4. The means for locating faults defined in claim 3 including means for adjusting the sensitivity of the amplifier circuit.

5. The means for locating faults defined in claim 3 including first and second coaxial cables, said first signal source being connected to said first winding by the first coaxial cable and said second winding being connected to the input of the amplifier circuit by the second coaxial cable.

6. The means for locating faults defined in claim 3 wherein said first signal source includes a bridge circuit and means for adjusting hte bridge circuit to produce a null reading in the meter.

7. Means for locating faults in wires and the like comprising a relatively high voltage source for generating a characteristic test signal adapted to be connected to a wire to be tested, and test means including a test meter and an associated circuit including an electromagnetic test probe for positioning adjacent to and movable relative to a wire to be tested, said test probe having a pair of inductively coupled windings positioned therein, means for applying a check voltage across one of said inductively coupled windings, said last named means including a voltage source and a bridge circuit, means for balancing the bridge circuit to produce a null condition on the test meter to minimize the effects in the other of said inductively coupled windings of signals that may be present in the conductor due to the environment in which the conductor is situated, said meter circuit also including signal amplifier means having an input connected to the other of said pair of inductively coupled test probe windings and an output connected to the test meter, said other test probe winding being responsive to the characteristic test signal, and means including the high voltage source for exciting a wire to be tested, said high voltage source including impedance means having a relatively high impedance compared to the impedance of the wire connected between said source and the wire to limit the current flow in the wire.

8. Means for locating faults in electrical conductors and the like comprising means for applying a characteristic test signal to a conductor to be tested, means connected to said signal applying means for limiting current flow in the conductor produced by the test signal, and means responsive to the application of a test signal applied to the conductor to indicate the condition of the conductor, said last named means including a test probe adapted to be positioned adjacent to and movable relative to the conductor at an intermediate location, said test probe having a pair of inductively coupled windings positioned therein, a test meter and associated meter circuit, means connecting one of said test probe windings to the input of the meter circuit, said one test probe winding being responsive to the characteristic signal and means for energizing the other of said test probe windings, said last named means including a voltage source and a bridge circuit, and means for adjusting the bridge circuit to produce a null condition of the meter, to minimize the effects in said one test probe winding of signals that may be present in the conductor due to the environment in which the conductor is situated.

9. The means for locating faults defined in claim 8 wherein said meter is an ammeter and said associated circuit includes an amplifier circuit having an input connected to said one test probe winding, and an output circuit including a full wave rectifier having output terminals connected to the test meter.

10. The means for locating faults defined in claim 8 wherein said current limiting means include a device having a relatively high impedance compared to the impedance of the conductor under test, said device being connected between the test signal applying means and the conductor to be tested.

11. The means for locating faults defined in claim 8 wherein said meter circuit includes sensitivity control means.

12. The means for locating faults defined in claim 8 wherein said meter circuit includes a plurality of transistorized amplifier stages.

13. The means for lacating faults defined in claim 8 wherein said meter circuit includes an input circuit including a capacitor in parallel with the said one test probe winding, said capacitor and said winding forming a tuned circuit capable of responding to a desired input signal.

(References on following page)

References Cited

UNITED STATES PATENTS

| | | | |
|---|---|---|---|
| 1,524,285 | 1/1925 | Besag | 324—117 |
| 2,494,206 | 1/1950 | Ross | 324—117 XR |
| 2,552,722 | 5/1951 | King. | |
| 2,690,536 | 9/1954 | Adams. | |
| 2,760,158 | 8/1956 | Kerns | 324—127 XR |
| 2,769,868 | 11/1956 | Brownlow | 324—52 XR |
| 3,007,106 | 10/1961 | Bergh et al. | 324—117 XR |

FOREIGN PATENTS 695,553  8/1940  Germany.

OTHER REFERENCES

Koranye, Current Monitoring Arrangement, IBM Technical Disclosure Bulletin, vol. 1, No. 2, August 1958, 324–127.

RUDOLPH V. ROLINEC, *Primary Examiner.*

G. R. STRECKER, *Assistant Examiner.*

U.S. Cl. X.R.

324—67

PO-1050
(5/69)

UNITED STATES PATENT OFFICE
CERTIFICATE OF CORRECTION

Patent No. 3,453,533     Dated July 1, 1969

Inventor(s) John J. Cox

It is certified that error appears in the above-identified patent and that said Letters Patent are hereby corrected as shown below:

Column 5, lines 24 and 25 -- after the word "means" in line 24, delete the phrase "including a test meter circuit and a probe" and substitute -- "including a meter circuit and a test probe".

Col. 6, line 1, change "hte" to "the".

Add the following references made of record by Patent Office Papers No. 3 and No. 4:

| | | | |
|---|---|---|---|
| 1,464,119 | 8/1923 | Stoller et al | 324-52 |
| 2,033,654 | 3/1936 | Selquist et al | 324-34 |
| 2,448,794 | 9/1948 | Goldsmith, Jr. etal | 324-37 |
| 2,689,331 | 9/1954 | Boyce et al | 324-34 |
| 2,844,787 | 7/1958 | McCann | 324-34 XR |
| 2,887,651 | 5/1959 | Piip | 324-34T uxr |
| 2,993,167 | 7/1961 | Smith | 324-52 |
| 3,075,144 | 1/1963 | Cooper | 324-34 |

SIGNED AND
SEALED

OCT 21 1969

(SEAL)
Attest:

Edward M. Fletcher, Jr.
Attesting Officer

WILLIAM E. SCHUYLER, JR.
Commissioner of Patents